United States Patent
Kasashima et al.

(10) Patent No.: US 6,322,926 B1
(45) Date of Patent: Nov. 27, 2001

(54) HYDROGEN ABSORBING ALLOY POWDER, PROCESS FOR PRODUCING SAME, AND ALKALINE SECONDARY BATTERY

(75) Inventors: Masaki Kasashima; Hiroto Sugahara, both of Fukui-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/358,607

(22) Filed: Jul. 21, 1999

(30) Foreign Application Priority Data

Jul. 22, 1998 (JP) .................................................. 10-222383

(51) Int. Cl.[7] ..................................................... H01M 4/02
(52) U.S. Cl. ......................................... 429/218.2; 420/900
(58) Field of Search .............................. 429/218.1, 218.2; 420/900

(56) References Cited

U.S. PATENT DOCUMENTS 5,837,317 * 11/1998 Moriwaki et al. ..................... 427/217
5,964,968 * 10/1999 Kaneko ................................. 148/555
6,053,995 *  4/2000 Tanibuchi et al. .................... 148/538

FOREIGN PATENT DOCUMENTS

0360203 A1   3/1990 (EP) .................................. B22F/1/00

OTHER PUBLICATIONS

European Search Report, European Application No. 99114053.4 (Sep. 29, 1999).

* cited by examiner

Primary Examiner—Gabrielle Brouillette
Assistant Examiner—Monique Wills
(74) Attorney, Agent, or Firm—Myers Bigel Sibley & Sajovec

(57) ABSTRACT

Provided is an $AB_5$ type hydrogen absorbing alloy powder obtained by quenching a melt of a hydrogen absorbing alloy rapidly and subjecting the resulting hydrogen absorbing alloy to fracturing by absorbing hydrogen, wherein the particle size distribution of the hydrogen absorbing alloy powder is such that, when the frequencies of detection of various particle diameters are cumulatively added from smaller-diameter to larger-diameter particles, and the particle diameters corresponding to 10%, 50% and 90% of all particles are represented by $D_{10}$, $D_{50}$ and $D_{90}$, respectively, the values of $D_{10}$, $D_{50}$ and $D_{90}$ fall within the respective ranges defined by $4\,\mu m \leq D_{10} \leq 14\,\mu m$, $17\,\mu m \leq D_{50} \leq 37\,\mu m$, and $40\,\mu m \leq D_{90} \leq 70\,\mu m$.

9 Claims, 9 Drawing Sheets

50μm ×500

50μm ×500

50μm  X500

HYDROGEN ABSORBING ALLOY POWDER, PROCESS FOR PRODUCING SAME, AND ALKALINE SECONDARY BATTERY

BACKGROUND OF THE INVENTION

1. Field of the Invention

This invention relates to a hydrogen absorbing alloy powder suitable for use in an environment where the alloy powder is subject to corrosion, such as alkaline secondary batteries.

2. Description of the Related Art

Generally, hydrogen absorbing alloys are not used in the form of an as-cast ingot, but in the form of a powder.

In the prior art, therefore, various methods for reducing a cast alloy ingot to an alloy powder having a desired average particle diameter have been employed. For example, the alloy ingot is reduced to coarse particles by primary pulverization with a jaw crusher or the like, and then to fine particles by secondary pulverization with a Brown mill or the like, followed by classification with a sieve. Alternatively, the alloy is formed into coarse primary particles, for example, by gas atomization, and then subjected to secondary pulverization with a pin mill or the like, following by classification with a sieve.

In all of these methods, the prepared alloy is ground by the action of mechanical impact, so that finely divided particles are produced during pulverizing. When the resulting pulverized product is classified to obtain a powder having a desired average particle diameter, this powder contains very large amounts of finer and coarser particles as compared with those of average diameter, as shown in FIGS. 4 and 7.

When an alloy powder containing large amounts of particles having diameters different from the desired one is used in an environment where the alloy powder is subject to corrosion, for example, in an alkaline secondary battery where the alloy powder is used as an electrode active material in a highly concentrated aqueous alkaline solution, its corrodibility by the aqueous alkaline solution used as the electrolyte (i.e., the ease with which alloy components dissolve from the alloy particles into the electrolyte), and its ease of charging and discharging (i.e., the ease with which hydrogen is absorbed into the alloy and released from the alloy) vary greatly according to the size of alloy particles.

As a result, it has been known that differences in corrodibility cause individual particles to vary in life (i.e., the period of time in which the initial characteristics are maintained), and differences in ease of charging and discharging cause individual particles to vary in characteristics such as electrical characteristics.

Consequently, it has been the existing state of the art that, when an alloy powder is used in the form of a mass of some size (e.g., an electrode), the characteristics (such as life and charge-discharge capacity) of the electrode depend on the lower limits of the characteristics of the alloy powder used therein and, therefore, the capabilities inherently possessed by the alloy powder are not fully brought out.

As a characteristic feature of a hydrogen absorbing alloy, changes in volume due to the absorption and release of hydrogen produce cracks. However, when an alloy powder is produced by mechanical impact pulverization, the alloy may be cracked at places different from those where cracks are produced by changes in volume. Consequently, when the cycle of hydrogen absorption and release is repeated many times, changes in volume due to the absorption and release of hydrogen produce cracks. This causes a further particle size reduction of the powder and hence accelerates the deterioration of the above-described characteristics.

In order to cope with the above-described situation, various measures for the improvement of corrosion resistance have been taken thus far. One example thereof is to suppress the corrosion of a mechanically ground alloy powder by applying a highly anticorrosive protective film thereto (e.g., plating the alloy powder with nickel) and thus preventing the electrolyte from coming into direct contact with the alloy. Another example is to treat alloy particles with a highly corrosive fluid (e.g., a hot aqueous alkaline solution), whereby the components which will dissolve upon contact with the electrolyte are leached out in advance and the elements which are highly resistant to corrosion by the electrolyte (e.g., nickel) are selectively left so as to serve as a protective film. Still another example is to prepare a homogeneous alloy powder by heat-treating a cast alloy so as to reduce the segregation of components in the alloy and homogenize its composition, and then grinding it mechanically, so that alloy components are prevented from being locally dissolved out upon direct contact with the electrolytic solution.

However, the above-described prior art methods have been almost ineffective in eliminating the variation in characteristics resulting from differences in alloy particle size and in preventing cracking and particle size reduction induced in the alloy by the absorption and release of hydrogen.

The reason for this is that all methods involve grinding an alloy by the action of mechanical impact and hence fail to cope with both of the problems arising from cracking and particle size reduction induced by the absorption and release of hydrogen, and the problems arising from a wide particle size distribution extending from fine particles to coarse particles, i.e., the above-described problems arising from the variation in characteristics resulting from differences in particle size.

SUMMARY OF THE INVENTION

Accordingly, an object of the present invention is to provide an alloy powder having a narrow particle size distribution centering about a desired particle diameter and containing small amounts of finer and coarser particles, whereby the problems arising from the variation in characteristics resulting from differences in alloy particle size and the problems arising from cracking and particle size reduction induced in the alloy by the absorption and release of hydrogen are solved.

In order to solve the above-described problems, the present invention provides an $AB_5$ type hydrogen absorbing alloy powder obtained by quenching (cooling) a melt of a hydrogen absorbing alloy rapidly and subjecting the resulting hydrogen absorbing alloy to fracturing by absorbing hydrogen, wherein the particle size distribution of the hydrogen absorbing alloy powder is such that, when the frequencies of detection of various particle diameters are cumulatively added from smaller-diameter to larger-diameter particles, the values of $D_{10}$, $D_{50}$ and $D_{90}$ fall within the respective ranges defined by 4 $\mu m \leq D_{10} \leq 14$ $\mu m$, 17 $\mu m \leq D_{50} \leq 37$ $\mu m$, and 40 $\mu m \leq D_{90} \leq 70$ $\mu m$.

In the practice of the present invention, an $AB_5$ type hydrogen absorbing alloy obtained by a rapid quenching method is subjected to fracturing by absorbing hydrogen, so that an alloy powder having a narrow particle size distribution centering about a desired particle diameter as shown in FIGS. 1–3 and containing small amounts of finer and coarser particles as shown in FIG. 6 can be obtained without classification.

In spite of the fact that the present invention requires a much simpler operation than the prior art, it can achieve an enhancement in initial characteristics, can suppress the precipitation of the hydroxides of alloy components on the alloy surface, and can bring about an improvement in life characteristics.

DETAILED DESCRIPTION OF PREFERRED EMBODIMENTS

Figure 1:
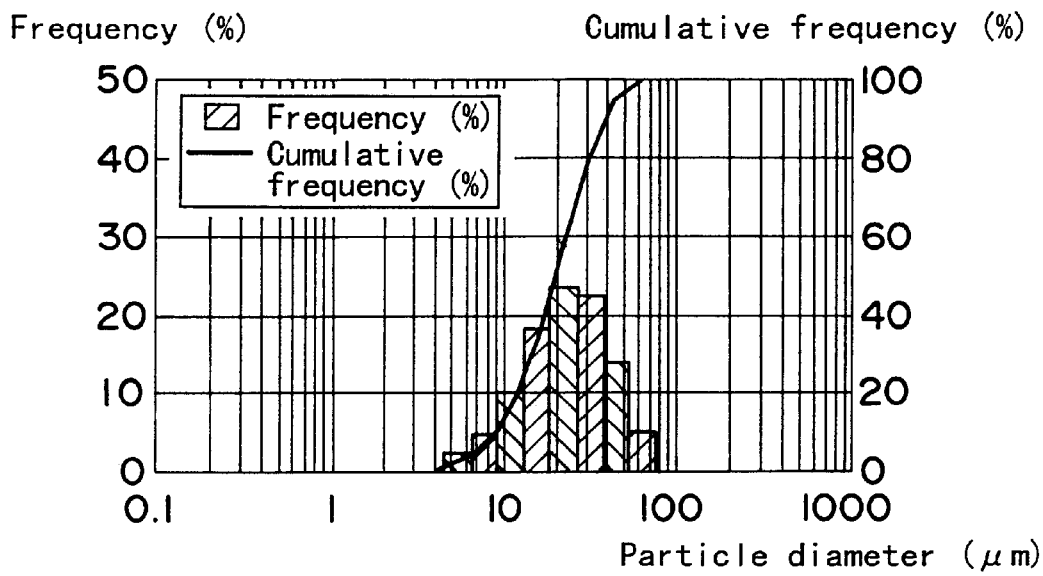
FIG. 1 is a graph showing the particle size distribution of an alloy powder obtained in Example 1.

As to the composition of the hydrogen absorbing alloy used in the present invention, an $AB_5$ type alloy composition is preferred because it is easy to control the size of crystals formed by quenching the alloy melt rapidly and hence manage the particle size distribution of the powder obtained by fracturing by absorbing hydrogen. This alloy composition is such that the component A comprises misch metal or an element or a mixture of two or more elements selected from the group consisting of La, Ce, Pr, Nd, Sm, Ga, Tb, Er, Yb, Y, Ti, V, Zr and Mg, and the component B comprises an element or a mixture of two or more elements selected from the group consisting of Al, Si, Mn, Co, Ni, Cu, Zn, Mo, W, Cr, Pb, Fe and Sn.

Although the component A may comprise commonly available misch metal (composed of La, Ce, Pr and Nd) alone, an alloy powder having more excellent characteristics can be obtained by using a binary system (e.g., La—Pr or La—Ce) having excellent low-temperature discharge characteristics and high rate discharge characteristics, and treating this alloy according to the present invention to impart excellent charge-discharge cycle characteristics thereto.

On the other hand, the component B may comprise a combination of elements which is obtained by using Ni, Co, Mn and Al as principal constituents and adding other elements thereto or substituting other elements therefor. Thus, there can be obtained an alloy powder having a well-balanced combination of characteristics.

As to the atomic ratio of B to A in the alloy composition, an $AB_5$ type hydrogen absorbing alloy having a B/A ratio in the range of 4.5 to 5.5 is preferred. The reason for this is that, when a melt of the alloy is rapidly quenched, the resulting alloy ribbon is not in an amorphous state, but produces grain boundaries therein and can readily yield a powder having a desired particle size distribution as a result of fracturing by absorbing hydrogen.

If the B/A ratio is outside the aforesaid range, it will be difficult to obtain a uniform alloy composition even by employing a rapid quenching method as dictated by the present invention. Consequently, the above-described problems cannot be satisfactorily solved even if the alloy is directly subjected to fracturing by absorbing hydrogen.

In the present invention, a hydrogen absorbing alloy powder is obtained by quenching a melt of the above-described hydrogen absorbing alloy rapidly and subjecting the resulting hydrogen absorbing alloy to fracturing by absorbing hydrogen.

The method for quenching the alloy melt rapidly should be a method which, when the alloy is reduced to a powder, permits alloy particles substantially free of or with small amount of oxide film and having a uniform composition and size to be easily produced in large amounts. Specifically, it is preferable to employ a rapid roll quenching method in which a mixture of raw materials capable of giving a desired alloy composition is charged into a crucible made of a refractory material, and melted by high-frequency heating or the like in a vacuum or in an atmosphere of an inert gas such as argon, and the resulting alloy melt is poured onto a rotating quench roll (consisting of a single roll or twin rolls) to quench the alloy melt rapidly and thereby yield an alloy ribbon having a thickness of 50 to 500 $\mu$m.

However, no particular limitation is placed on the type of the rapid quenching method, provided that it can produce alloy particles substantially free or with a small amount of oxide film and having a uniform alloy composition.

The conditions of rapid quenching may be controlled so that the $D_{10}$, $D_{50}$ and $D_{90}$ values of the particle size distribution will fall within their respective ranges. For example, this may be done by controlling the cooling rate of the alloy melt so as to yield a hydrogen absorbing alloy having a thickness of 50 to 500 $\mu$m.

As used herein, $D_{10}$, $D_{50}$ and $D_{90}$ are defined in such a way that, when the particle size distribution of the hydrogen absorbing alloy is measured and the frequencies of detection of various particle diameters are-cumulatively added from smaller-diameter to larger-diameter particles, the particle diameters corresponding to 10%, 50% and 90% of all particles are represented by $D_{10}$, $D_{50}$ and $D_{90}$, respectively.

The particle size distribution of the hydrogen absorbing alloy is measured according to Nikkiso Operators' Manual No. 3084. Specifically, the hydrogen absorbing alloy is dispersed in ion-exchange water and its particle size distribution is measured by means of a Microtrack MK-II (SRA) (a scattered laser light detection type analyzer; manufactured by Leed & Northrup).

As to the ranges of $D_{10}$, $D_{50}$ and $D_{90}$, the value of $D_{50}$ corresponding to 50% of all particles should be in the range defined by 17 $\mu$m$\leq D_{50} \leq$37 $\mu$m, so that the alloy powder may exhibit satisfactory initial characteristics and life characteristics when used as electrodes for alkaline secondary batteries, and the alloy powder may have good handleability in the steps up to the formation of electrodes. On the finer particle side, the value of $D_{10}$ should be in the range defined by 4 $\mu$m$\leq D_{10} \leq$14 $\mu$m, so that further cracking may not occur during charge-discharge cycles and so that, even if the alloy powder is allowed to stand in a dry state, the alloy powder will involve a relatively low risk of spontaneous ignition or the like and can hence be handled easily.

On the coarser particle side, the value of $D_{90}$ should be in the range defined by 40 $\mu$m$\leq D_{90} \leq$70 $\mu$m, so that, when the alloy powder having $D_{10}$ and $D_{50}$ values within the above-defined ranges is in the form of a dry powder or a paste, satisfactory flowability may be obtained.

In the actual composition, the values of $D_{10}$, $D_{50}$ and $D_{90}$ should be suitably chosen from various combinations so as to give a narrow particle size distribution. Specific examples of suitable combinations are as follows: $D_{10}$=4 $\mu$m, $D_{50}$=17 $\mu$m, and $D_{90}$=40 $\mu$m; and $D_{10}$=14 $\mu$m, $D_{50}$=37 $\mu$m, and $D_{90}$=70 $\mu$m.

This makes it possible to eliminate the troubles and deterioration in characteristics which may occur when the values of $D_{10}$, $D_{50}$ and $D_{90}$ are not within the aforesaid respective ranges. These problems, which have previously described in connection with the prior art, include the facts that, during the production of a powder or the formation of an electrode, the powder or electrode may be spontaneously ignited or the powder may solidify owing to its poor flowability, and that the alloy is progressively cracked as the number of charge-discharge cycles is increased, and the average particle diameter of the powder applied to the electrode shifts considerably to the finer particle side and causes a marked deterioration in characteristics as compared with initial characteristics.

The thickness of the alloy ribbon obtained by roll quenching should preferably be in the range of 50 to 500 $\mu$m so that the powder obtained by subjecting the ribbon to fracturing by absorbing hydrogen may have a combination of $D_{10}$, $D_{50}$ and $D_{90}$ falling within the aforesaid respective ranges.

As the method for pulverizing the alloy ribbon, fracturing by absorbing hydrogen is employed with attention paid to the fact that, when an alloy absorbs and releases hydrogen, the resulting distortion due to changes in volume produces cracks at grain boundaries of the alloy and hence causes the alloy to disintegrate into a powder of itself. This fracturing by absorbing hydrogen is characterized in that the alloy is mildly distorted during fracturing and hence produces no finely divided particles, so that the particle size distribution of the resulting powder is directly determined by the grain size distribution controlled by rapid quenching.

The conditions of fracturing by absorbing hydrogen should be such that as few steps as possible are required to reduce the alloy to a powder.

As to the pressure of hydrogen, it is preferable on the basis of a trade-off between pulverization efficiency and safety to raise the pressure to a level in the range of 2 to less than 10 atmospheres during the absorption of hydrogen and reduce the pressure to $10^{-2}$ Torr during the release of hydrogen.

As to the temperature, it is preferable for the same reason that the temperature during the release of hydrogen from the alloy be higher than the temperature during the absorption of hydrogen into the alloy. Specifically, it is preferable to employ a release temperature of 40 to 70° C. and an absorption temperature of 0 to 30° C.

With particular reference to the introduction of hydrogen, it is preferable to enhance the fracturing efficiency of the alloy by introducing hydrogen to such an extent that hydrogen sufficiently diffuses into the alloy and the entire alloy forms a hydride.

In order to impart further corrosion resistance to the alloy powder obtained by fracturing by absorbing hydrogen, it is conceivable to subject the alloy powder to a wet surface treatment such as soaking in an aqueous solution of an acid or alkali, or plating with a metal.

Alternatively, the alloy powder may be subjected to a dry surface treatment in which a very thin oxide film is formed on the surfaces of alloy particles by exposing the alloy powder to air or heat-treating the allow powder in an inert atmosphere containing a slight amount of an oxygen source.

Furthermore, in handling the alloy powder, care should be taken to prevent a significant deterioration in characteristics due to the rapid oxidation of alloy particles which will occur when the alloy powder is allowed to stand in air after fracturing by absorbing hydrogen or surface treatment. For this purpose, it is effective not only to store and handle in an atmosphere of an inert gas, but also to store and handle the alloy powder while immersing it in a medium which can suppress rapid oxidation, such as distilled water or ion-exchange water.

The alloy powder thus obtained may be formed into negative electrodes according to a well-known method. For example, this may be done by mixing 100 parts by weight of the alloy powder with 0.1 to 20 parts by weight of a binder such as polyvinyl alcohol (PVA), a cellulose derivative (e.g., carboxymethylcellulose (CMC)), polytetrafluoroethylene (PTFE), polyethylene oxide or a high polymer latex, and 0.5 to 10 parts by weight of an electrically conducting filler such as carbon-graphite powder or nickel powder, and then filling the resulting paste into electrically conducting porous supports (e.g., bodies made of fibrous nickel or foamed nickel) or pressing it into contact with electrically conducting plate-like supports (e.g., punching metals).

Positive electrodes may be formed in the well-known manner. For example, this may be done by filling nickel hydroxide into electrically conducting porous supports made of foamed nickel or the like.

Alkaline secondary batteries may be constructed by disposing such negative and positive electrodes together with a separator (for example, of polypropylene) interposed therebetween, and placing this assembly in a sealed container filled with an electrolyte comprising an aqueous alkaline solution.

The alloy powder of the present invention is intended for use in an environment where the alloy powder is subject to corrosion, such as aqueous alkaline solutions. However, since individual alloy particles show little variation in characteristics and, therefore, the characteristics of the whole powder are uniform as described above, the alloy powder of the present invention may also be advantageously used as a heat storage material for heat pumps and the like.

EXAMPLES 1–3

Raw materials were mixed so as to give an alloy composition in which La, Pr, Ni, Co, Mn and Al were present in atomic ratios of 0.8, 0.2, 3.9, 0.6, 0.1 and 0.4, respectively. After this mixture was placed in a crucible and melted by high-frequency heating under an inert atmosphere, the resulting melt was fed from the crucible through a tundish to a roll rotating at a circumferential speed of 9 m/sec (Example 1), 4 m/sec (Example 2) or 2 m/sec (Example 3). Thus, the melt was rapidly quenched to obtain a ribbon having a thickness range of 50 to 150 $\mu$m (Example 1), 170 to 350 $\mu$m (Example 2), or 370 to 500 $\mu$m (Example 3).

100 g of each of the ribbons thus obtained was placed in a sealable vessel. After this vessel was evacuated at room temperature until its internal pressure was reduced to 2 Pa, hydrogen gas was introduced therein to up to 0.9 MPa, and held therein at room temperature for about 10 minutes. Then, the vessel was heated to 60° C. and evacuated again until its internal pressure was reduced to 2 Pa. After this procedure was repeated three times, the resulting alloy powder was taken out of the vessel.

Without classification, the taken-out alloy powder was dispersed in ion-exchange water and its particle size distribution was measured by means of a Microtrack MK-II (SRA) (a scattered laser light detection type analyzer; manufactured by Leed & Northrup).

Measurements were made according to Nikkiso Operators' Manual No. 3084.

0.25 g of a 3 wt % aqueous solution of PVA was added to and mixed with 1 g of the alloy powder. The resulting slurry was applied onto a current-collecting fibrous nickel substrate having a Ni lead attached thereto by electric spot welding. After drying under reduced pressure, this substrate was interposed between two layers of fibrous nickel. Using a hydraulic press, this assembly was pressed under a pressure of about 560 kgf/cm$^2$ for 1 minute to form an electrode (negative electrode).

The electrode so formed was wrapped with a polypropylene separator and then interposed between two electrodes (positive electrodes) made of nickel hydroxide. This electrode assembly, together with a Hg/HgO reference electrode, was placed in a vessel made of polypropylene, and an 8N aqueous solution of KOH was poured thereinto to construct an open type battery.

Figure 12:
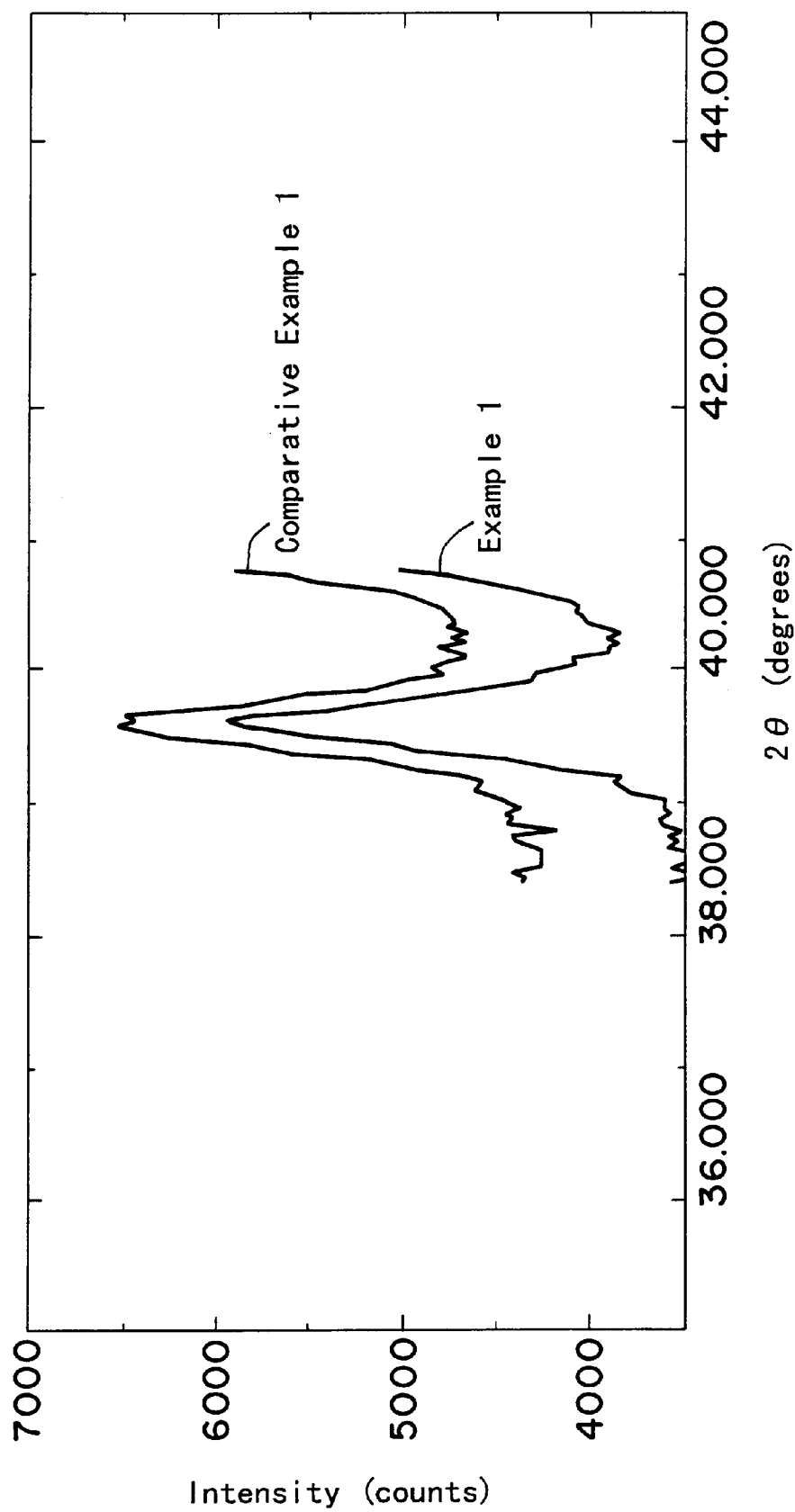
FIG. 12 is a graph showing the results of XRD analysis of the surfaces of the alloy powders of Example 1 and Comparative Example 1 having been-undergone charge-discharge cycles.

This battery was charged at 130 mA for 3 hours, rested for 10 minutes, discharged at 130 mA until the battery voltage reached 0.7 V relative to the mercury reference electrode (Hg/HgO), and rested for 10 minutes. By repeating this charge-discharge cycle, changes in discharge capacity were observed as a function of the number of cycles (FIG. 9) and the degree of deterioration of characteristics due to cracking and particle size reduction (i.e., life characteristics) were evaluated. Moreover, in order to examine the degree of corrosion by the electrolyte, the battery having undergone charge-discharge cycles was disassembled, and the amount of material deposited on the powder surface of the negative electrode was evaluated by making scanning electron micrographs of the powder surface (FIG. 10) and measuring the intensity of the hydroxide peak recorded by XRD analysis (FIG. 12).

Comparative Example 1

Raw materials were mixed so as to give an alloy composition in which La, Pr, Ni, Co, Mn and Al were present in atomic ratios of 0.8, 0.2, 3.9, 0.6, 0.1 and 0.4, respectively. After this mixture was placed in a crucible and melted by high-frequency heating under an inert atmosphere, the resulting melt was fed into a mold by way of a tundish. Thus, the melt was cast to obtain an alloy ingot having a thickness of 20–35 mm.

After this alloy ingot was heat-treated at 1,050° C. for 18 hours in an atmosphere of argon gas, it was subjected to primary puvelization with a jaw crusher and then to secondary pulverization with a Brown mill. The pulverized product was classified with a 200 mesh sieve to obtain a desired alloy powder.

After the particle size distribution of this alloy powder was measured in the same manner as in the Examples, it was surface-treated with an 8N aqueous solution of KOH at 80° C. for 10 minutes, washed with deionized water, and dried under reduced pressure. Then, this alloy powder was evaluated in comparison with those of the Examples, by constructing an open type battery similar to those of the Examples and subjecting it to a charge-discharge cycle test.

Comparative Example 2

Raw materials were mixed so as to give an alloy composition in which La, Pr, Ni, Co, Mn and Al were present in atomic ratios of 0.8, 0.2, 3.9, 0.6, 0.1 and 0.4, respectively. After this mixture was placed in a crucible and melted by high-frequency heating under an inert atmosphere, the resulting melt was fed from the crucible through a tundish to a roll rotating at a circumferential speed of 4 m/sec. Thus, the melt was rapidly quenched to obtain a ribbon having a thickness range of 170 to 350 μm.

This ribbon was subjected to primary pulverization with a jaw crusher and then to secondary pulverization with a Brown mill. The pulverized product was classified with a 200 mesh sieve to obtain a desired alloy powder.

After the particle size distribution of this alloy powder was measured in the same manner as in the Examples, it was evaluated in comparison with those of the Examples, by constructing an open type battery similar to those of the Examples and Comparative Example 1 and subjecting it to a charge-discharge cycle test.

TABLE 1

| | | $D_{10}$ (μm) | $D_{50}$ (μm) | $D_{90}$ (μm) |
|---|---|---|---|---|
| Example 1 | 50–150 μm + fracturing by absorbing hydrogen | 8 | 19 | 40 |
| Example 2 | 170–350 μm + fracturing by absorbing hydrogen | 10 | 26 | 60 |
| Example 3 | 370–500 μm + fracturing by absorbing hydrogen | 13 | 33 | 70 |
| Comparative Example 1 | Casting in mold + impact pulverization | 9.6 | 34 | 67 |
| Comparative Example 2 | 170–350 μm + impact pulverization | 9.5 | 34 | 66 |

Figure 2:
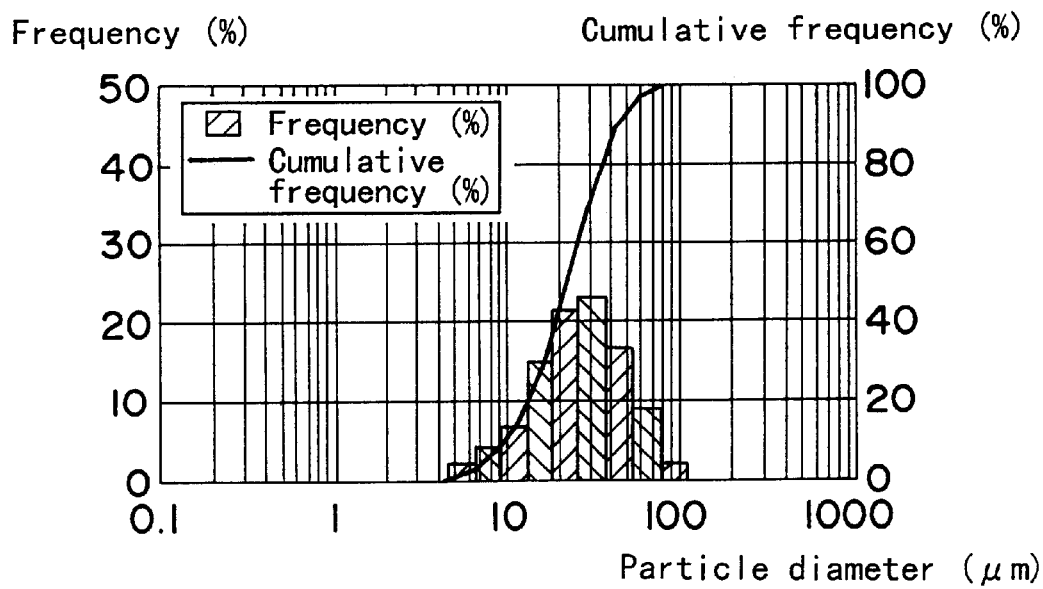
FIG. 2 is a graph showing the particle size distribution of an alloy powder obtained in Example 2.
Figure 3:
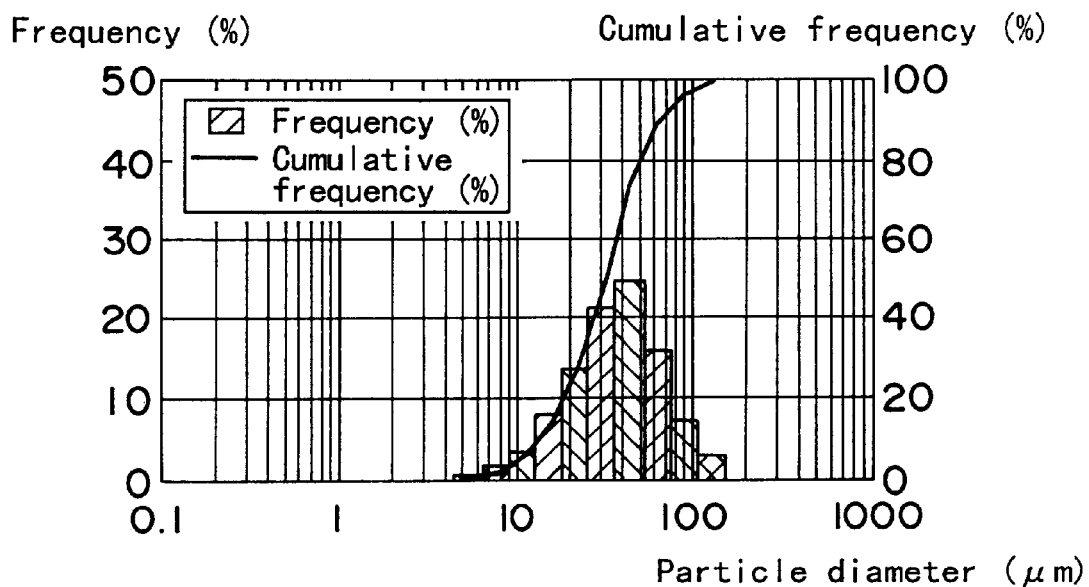
FIG. 3 is a graph showing the particle size distribution of an alloy powder obtained in Example 3.
Figure 4:
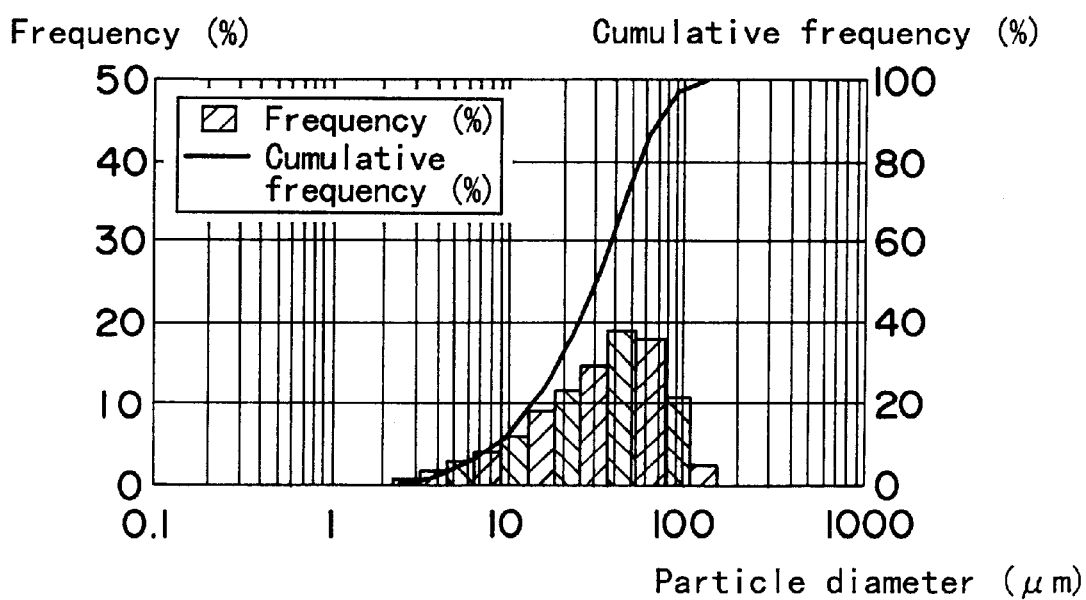
FIG. 4 is a graph showing the particle size distribution of an alloy powder obtained in Comparative Example 1.
Figure 5:
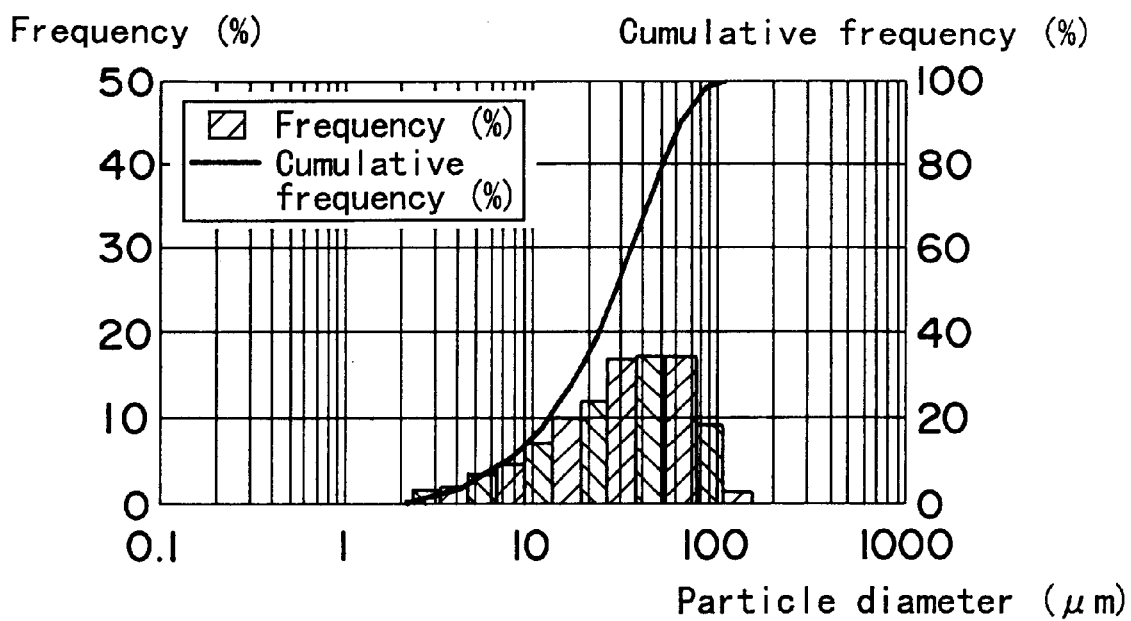
FIG. 5 is a graph showing the particle size distribution of an alloy powder obtained in Comparative Example 2.

The results of measurement of the particle size distributions of the alloy powders obtained in the Examples and the Comparative Examples reveal that, in contrast to the alloy powder of Comparative Example 1 obtained by casting in a mold and impact pulverization (FIG. 4) and the alloy powder of Comparative Example 2 obtained by roll quenching and impact pulverization (FIG. 5), the alloy powders of the Examples have a narrow particle size distribution centering about an average particle diameter as shown in FIGS. 1 to 3.

Figure 6:
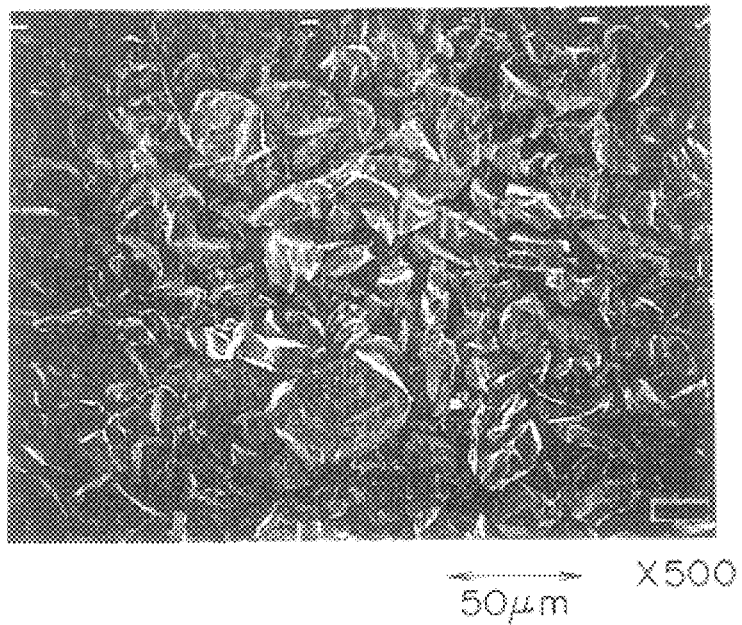
FIG. 6 is a scanning electron micrograph (X500) of the alloy powder obtained in Example 2.
Figure 7:
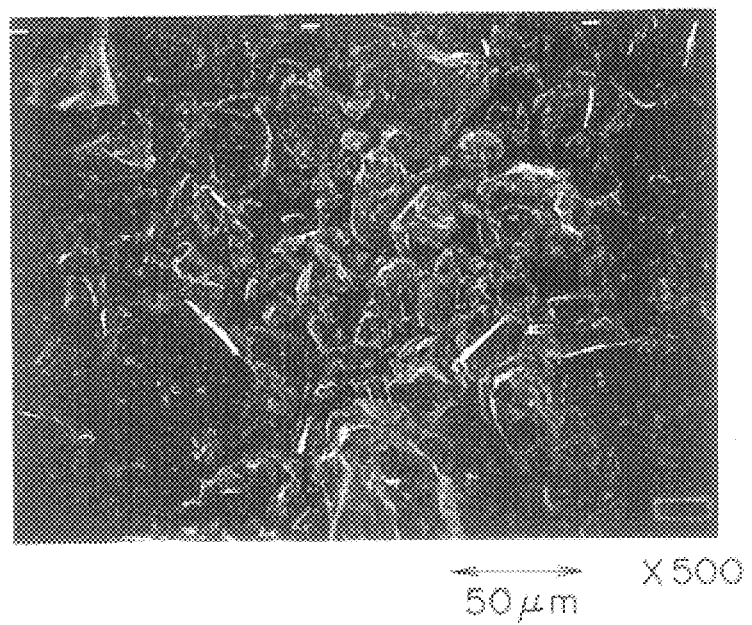
FIG. 7 is a scanning electron micrograph (X500) of the alloy powder obtained in Comparative Example 1.
Figure 8:
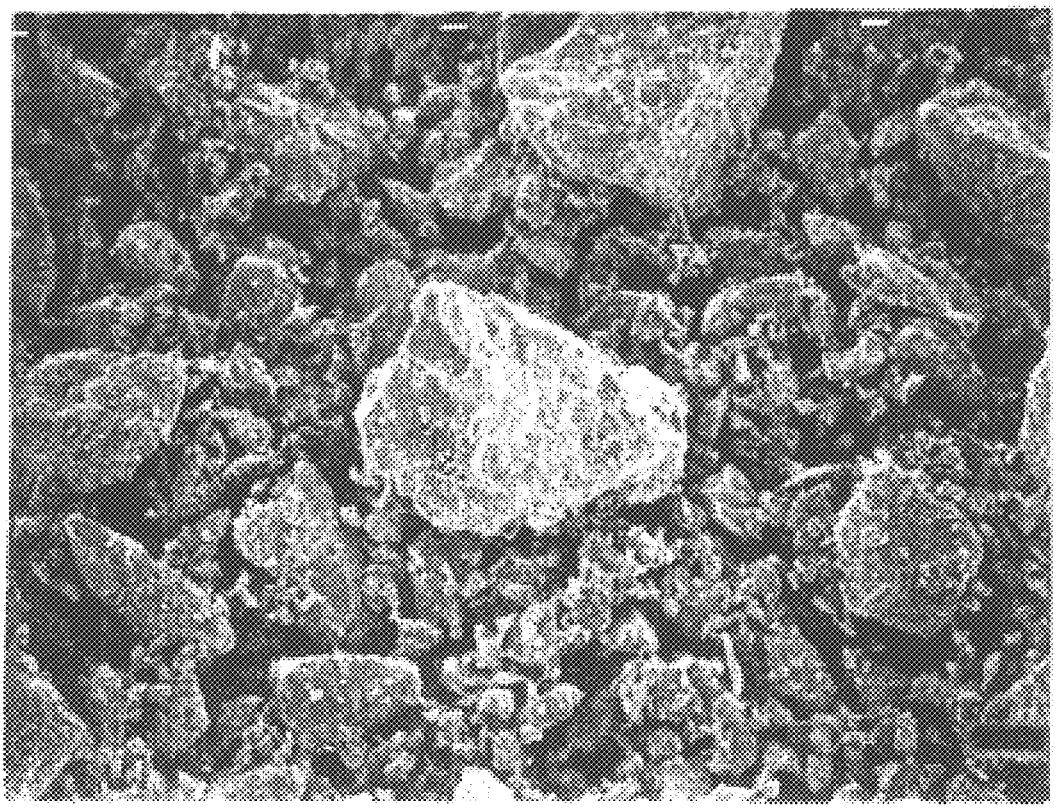
FIG. 8 is a scanning electron micrograph (X500) of the alloy powder obtained in Comparative Example 2.

Moreover, the results of observation of the alloy powders obtained in the Examples and the Comparative Examples with a scanning electron microscope also reveal that, in contrast to the alloy powder of Comparative Example 1 obtained by casting in a mold and impact pulverization (FIG. 7) and the alloy powder of Comparative Example 2 obtained by roll quenching and impact pulverization (FIG. 8), the alloy powders of the Examples are uniform in particle diameter and contain small amounts of finer and coarser particles (FIG. 6).

Figure 9:
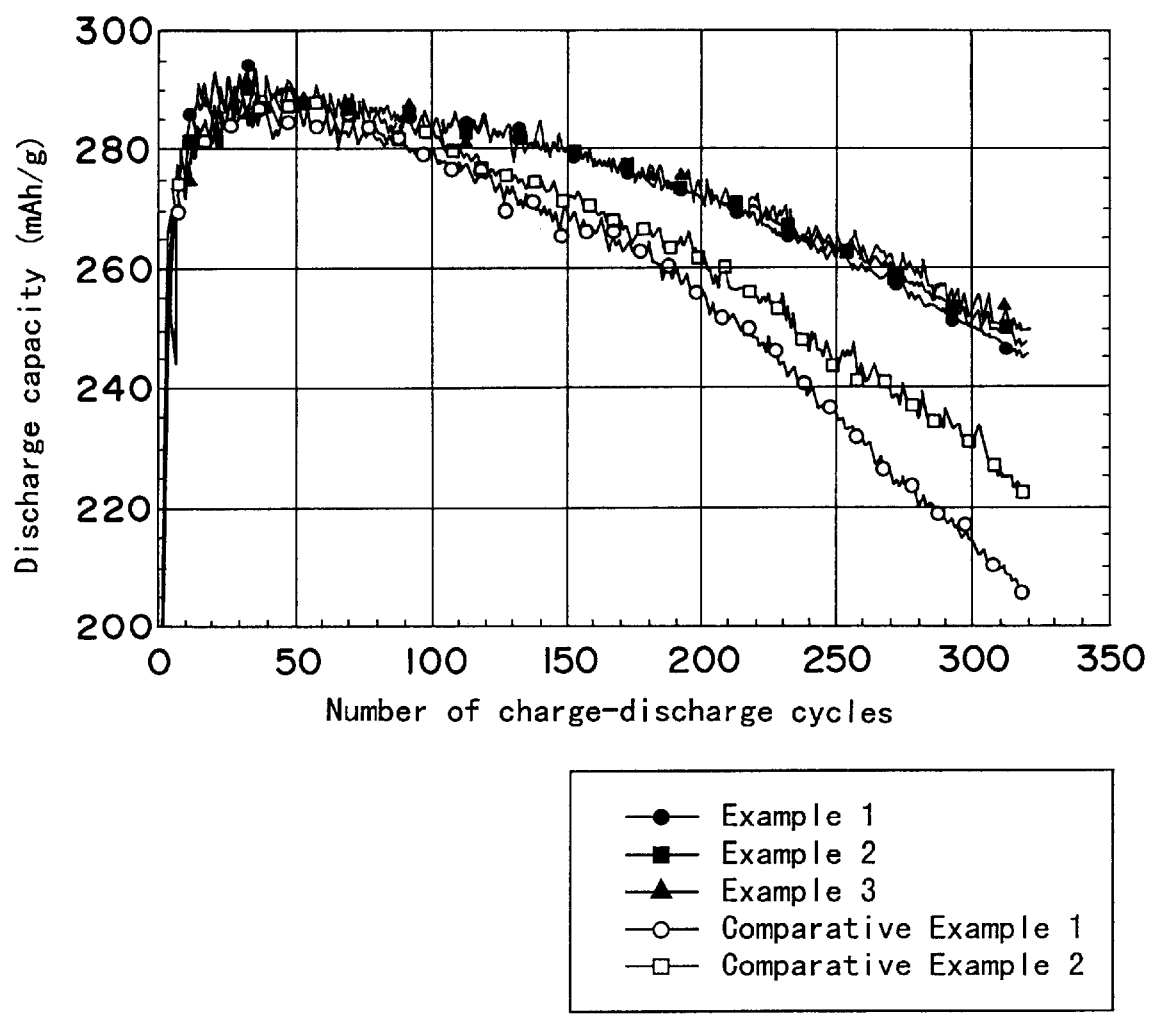
FIG. 9 is a graph showing the charge-discharge cycle characteristics of batteries constructed in Examples 1–3 and Comparative Examples 1–2.
Figure 10A:
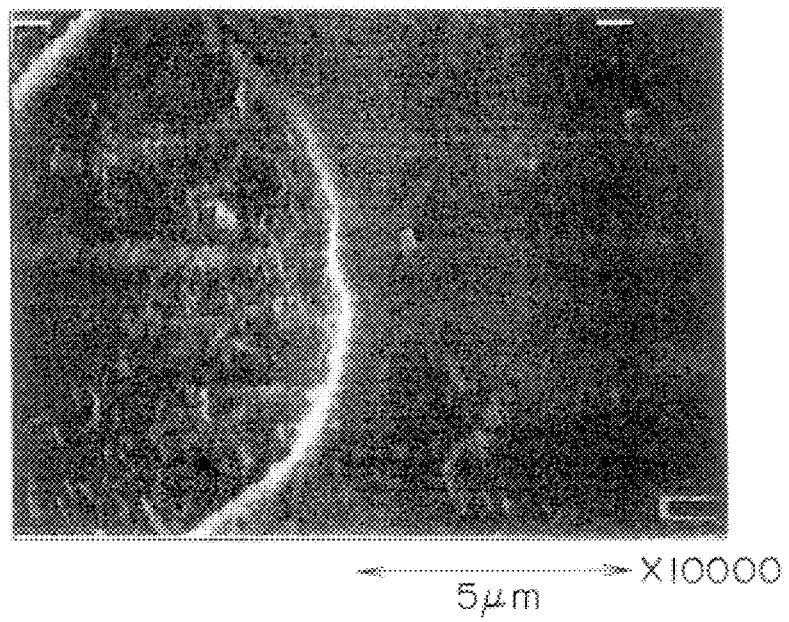
FIGS. 10(a) and 10(b) include scanning electron micrographs (X10,000) of the surface of the alloy powder of Example 1 having been subjected to charge-discharge cycles.
Figure 10B:
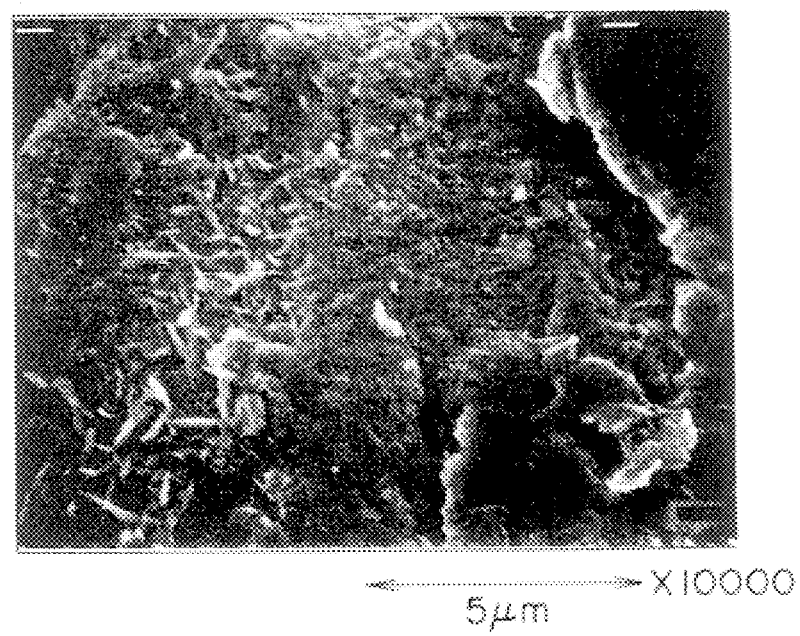
Figure 11A:
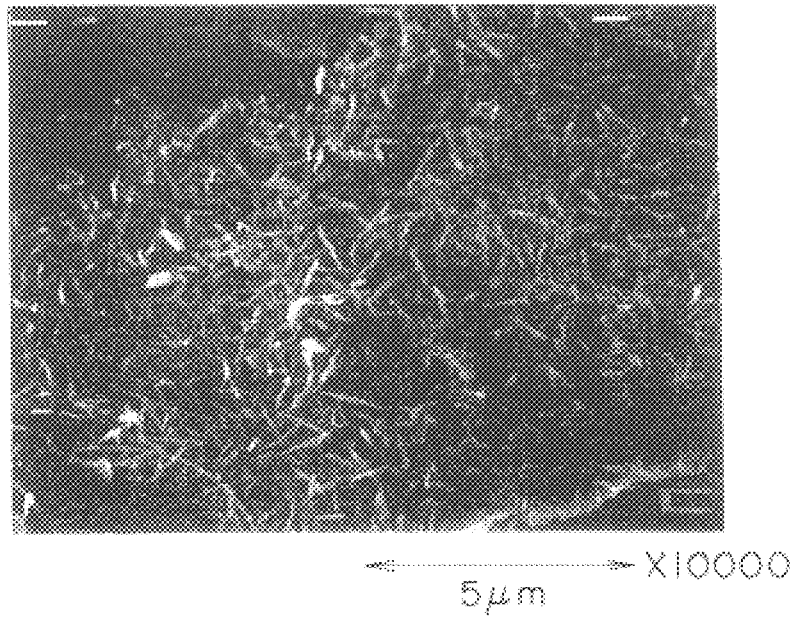
FIGS. 11(a) and 11(b) include scanning electron micrographs (X10,000) of the surface of the alloy powder of Comparative Example 1 having been subjected to charge-discharge cycles.
Figure 11B:
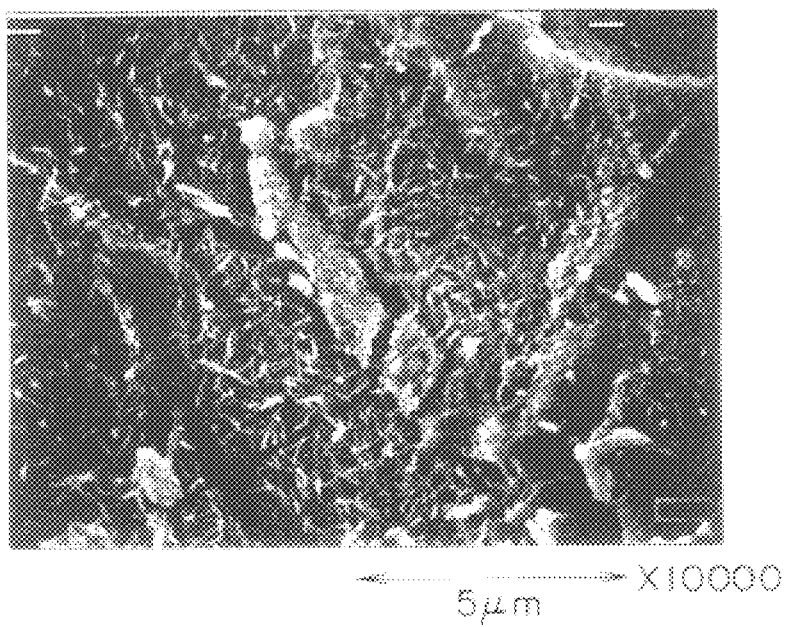

With regard to charge-discharge cycle characteristics, it can be seen from FIG. 9 that, although the batteries of the Examples vary slightly in characteristics according to differences in particle size distribution, all of them are more excellent in initial capacity, attainable capacity and cycle life than those of the Comparative Examples.

Upon examination of scanning electron micrographs of the surfaces of the alloy powders having undergone charge-discharge cycles as shown in FIG. 9, it can be seen that the amount of needle-like precipitates (i.e., precipitated alloy components) present on the surface of the alloy surface is smaller in Example 1 (FIG. 10) than in Comparative Example 1. This indicates that the precipitation of hydroxides formed from alloy components having dissolved out is suppressed.

FIG. 12 shows the results of XRD analysis of the surfaces of the alloy powders of Example 1 and Comparative Example 1 having undergone charge-discharge cycles. It can also be seen from this figure that the intensity of the peak for the hydroxides of alloy components is lower and, therefore, the precipitation of such hydroxides is suppressed.

What is claimed is:

1. An $AB_5$ type hydrogen absorbing alloy powder obtained by preparing a hydrogen absorbing alloy according to a rapid quenching method and subjecting the hydrogen absorbing alloy to fracturing by absorbing hydrogen, wherein the particle size distribution of the hydrogen absorbing alloy powder resulting from fracturing by absorbing hydrogen is such that, when the frequencies of detection of various particle diameters are cumulatively added from smaller-diameter to larger-diameter particles, corresponding to 10%, 50%, and 90% in size of all particles are represented by $D_{10}$, $D_{50}$, and $D_{90}$, respectively, the values of $D_{10}$, $D_{50}$, and $D_{90}$ fall within the respective ranges defined by $4\ \mu m \leq D_{10} \leq 14\ \mu m$, $17\ \mu m \leq D_{50} \leq 37\ \mu m$, and $40\ \mu m \leq D_{90} \leq 70\ \mu m$.

2. An $AB_5$ type hydrogen absorbing alloy powder according to claim 1 wherein the component A comprises misch metal or an element or a mixture of two or more elements selected from the group consisting of La, Ce, Pr, Nd, Sm, Ga, Tb, Er, Yb, Y, Ti, V, Zr and Mg, the component B comprises an element or a mixture of two or more elements selected from the group consisting of Al, Si, Mn, Co, Ni, Cu, Zn, Mo, W, Cr, Pb, Fe and Sn, and the atomic ratio of B to A is in the range of 4.5 to 5.5.

3. An $AB_5$ type hydrogen absorbing alloy powder according to claim 1 wherein the hydrogen absorbing alloy prepared according to the rapid quenching method and ready for fracturing by absorbing hydrogen has a thickness in the range of 50 to 500 $\mu m$.

4. An $AB_5$ type hydrogen absorbing alloy powder according to claim 2 wherein the hydrogen absorbing alloy prepared according to the rapid quenching method and ready for fracturing by absorbing hydrogen has a thickness in the range of 50 to 500 $\mu m$.

5. A process for the production of an $AB_5$ type hydrogen absorbing alloy powder which comprises the steps of preparing a hydrogen absorbing alloy according to a roll quenching method, and subjecting the hydrogen absorbing alloy to fracturing by absorbing hydrogen so as to yield a hydrogen absorbing alloy powder having such a particle size distribution that, when the frequencies of detection of various particle diameters are cumulatively added from smaller-diameter to larger-diameter particles, and the particle diameters corresponding to 10%, 50% and 90% in size of all particles are represented by $D_{10}$, $D_{50}$, and $D_{90}$, respectively, the values of $D_{10}$, $D_{50}$, and $D_{90}$ fall within the respective ranges defined by $4\ \mu m \leq D_{10} \leq 14\ \mu m$, $17\ \mu m \leq D_{50} \leq 37\ \mu m$, and $40\ \mu m \leq D_{90} \leq 70\ \mu m$.

6. A process for the production of an $AB_5$ type hydrogen absorbing alloy powder according to claim 5 wherein the hydrogen absorbing alloy prepared according to the roll quenching method and ready for fracturing by absorbing hydrogen has a thickness in the range of 50 to 500 $\mu m$.

7. An alkaline secondary battery wherein an $AB_5$ type hydrogen absorbing alloy powder according to claim 1 is used as the negative electrode active material.

8. An alkaline secondary battery wherein an $AB_5$ type hydrogen absorbing alloy powder according to claim 2 is used as the negative electrode active material.

9. An alkaline secondary battery wherein an $AB_5$ type hydrogen absorbing alloy powder according to claim 3 is used as the negative electrode active material.

* * * * *